United States Patent
Scott et al.

(10) Patent No.: US 8,727,105 B2
(45) Date of Patent: May 20, 2014

(54) ROLLER INSERTS FOR CONVEYOR ROLLERS AND ROLLER ASSEMBLIES INCLUDING THE SAME

(75) Inventors: Charles Winfield Scott, Cincinnati, OH (US); James D. Varvell, Aberdeen, OH (US)

(73) Assignee: SST Bearing Corporation, Lebanon, OH (US)

( * ) Notice: Subject to any disclaimer, the term of this patent is extended or adjusted under 35 U.S.C. 154(b) by 57 days.

(21) Appl. No.: 13/469,414

(22) Filed: May 11, 2012

(65) Prior Publication Data
US 2012/0285802 A1 Nov. 15, 2012

Related U.S. Application Data

(60) Provisional application No. 61/485,672, filed on May 13, 2011.

(51) Int. Cl.
*B65G 13/06* (2006.01)

(52) U.S. Cl.
USPC .......................................... 198/788; 198/789

(58) Field of Classification Search
USPC ........ 198/780, 788, 789; 193/35 B, 35 R, 37; 384/418, 419, 518, 547
See application file for complete search history.

(56) References Cited

U.S. PATENT DOCUMENTS

| | | | |
|---|---|---|---|
| 3,793,689 A * | 2/1974 | Specth | 193/37 |
| 4,339,158 A * | 7/1982 | Greener et al. | 384/489 |
| 5,865,290 A | 2/1999 | Scott | |
| 7,028,825 B2 | 4/2006 | Scott | |
| 8,006,829 B2 * | 8/2011 | Itoh et al. | 198/788 |
| 8,376,128 B2 * | 2/2013 | Kim | 198/827 |
| 2006/0180426 A1 * | 8/2006 | Scott | 193/37 |
| 2007/0261933 A1 * | 11/2007 | Scott | 193/37 |
| 2011/0240444 A1 * | 10/2011 | Kim | 198/842 |

* cited by examiner

*Primary Examiner* — Leslie A Nicholson, III
(74) *Attorney, Agent, or Firm* — Dinsmore & Shohl LLP

(57) ABSTRACT

A roller insert for a conveyor roller tube includes a cartridge housing having an inside end and an outside end, an outside bearing positioned proximate to the outside end of the cartridge housing, where the outside bearing has an inner race and an outer race, and a stub axle. The stub axle includes an elongate body portion having a drive interface portion positioned distally from the outside end of the cartridge housing. The roller insert also includes a bushing coupled to the inner race of the outside bearing, where the bushing includes a bore portion extending along the inner race of the outside bearing. The roller insert further includes a jacket at least partially surrounding an outer perimeter of the cartridge housing and extending in an axial direction to at least partially encapsulate the outer race of the outside bearing in the axial direction.

19 Claims, 4 Drawing Sheets

ROLLER INSERTS FOR CONVEYOR ROLLERS AND ROLLER ASSEMBLIES INCLUDING THE SAME

CROSS-REFERENCE TO RELATED APPLICATIONS

The present applications claims priority to U.S. Provisional Patent Application Ser. No. 61/485,672, titled "Inserts for Conveyor Rollers" filed May 13, 2011.

TECHNICAL FIELD

The present specification generally relates to roller inserts for conveyor rollers and, in particular, roller inserts having bearings and stub axles for positioning and supporting conveyor rollers.

BACKGROUND

Conveyor systems are used in a variety of industrial applications. In a conventional configuration, a plurality of closely spaced, freely-rotating conveying rollers are mounted in parallel in an elongate support frame. The structure for mounting the rollers to the support form is integral with the rollers. In some conveyor roller designs, inserts are mounted in each end of the conveyor roller tube and include protrusions that extend outwardly from the ends of the tube. The protrusions are received within opposing pairs of mounting holes in the elongate support frame.

Increase in the drag of the inserts about which the rollers rotate leads to an increase in power required to be applied to the plurality of rollers to translate material along the conveyor system. Accordingly, conveyor systems that include roller inserts having low rotational drag are required.

SUMMARY

In one embodiment, a roller insert for conveyor roller tubes includes a cartridge housing having an inside end and an outside end, an outside bearing positioned proximate to the outside end of the cartridge housing, where the outside bearing has an inner race and an outer race, and a stub axle. The stub axle includes an elongate body portion having a drive interface portion positioned distally from the outside end of the cartridge housing. The roller insert also includes a bushing coupled to the inner race of the outside bearing, where the bushing includes a bore portion extending along the inner race of the outside bearing. The roller insert further includes a jacket at least partially surrounding an outer perimeter of the cartridge housing and extending in an axial direction to at least partially encapsulate the outer race of the outside bearing in the axial direction.

In another embodiment, a roller insert for conveyor roller tubes includes a cartridge housing having an inside end and an outside end, an outside bearing positioned proximate to the outside end of the cartridge housing, where the outside bearing has an inner race and an outer race, and an inside bearing positioned proximate to the inside end of the cartridge housing, where the inside bearing has an inner race and an outer race. The roller insert also includes a stub axle including an elongate body portion having a drive interface portion positioned distally from the outside end of the cartridge housing. The roller insert further includes a jacket at least partially surrounding an outer perimeter of the cartridge housing and extending in an axial direction to at least partially encapsulate the outer race of the outside bearing and the outer race of the inside bearing in the axial direction.

In yet another embodiment, a roller assembly for use in a conveyor roller includes a conveyor roller tube having an outer diameter and an inner diameter and a roller insert inserted into the inner diameter of the conveyor roller tube. The roller insert includes a cartridge housing having an inside end and an outside end, and an outside bearing positioned proximate to the outside end of the cartridge housing, where the outside bearing has an inner race and an outer race, and a stub axle. The stub axle includes an elongate body portion having a drive interface portion positioned distally from the outside end of the cartridge housing. The roller insert further includes a bushing coupled to the inner race of the outside bearing, where the bushing includes a bore portion extending along the inner race of the outside bearing. The roller insert also includes a jacket at least partially surrounding an outer perimeter of the cartridge housing and extending in an axial direction to at least partially encapsulate the outer race of the outside bearing in the axial direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
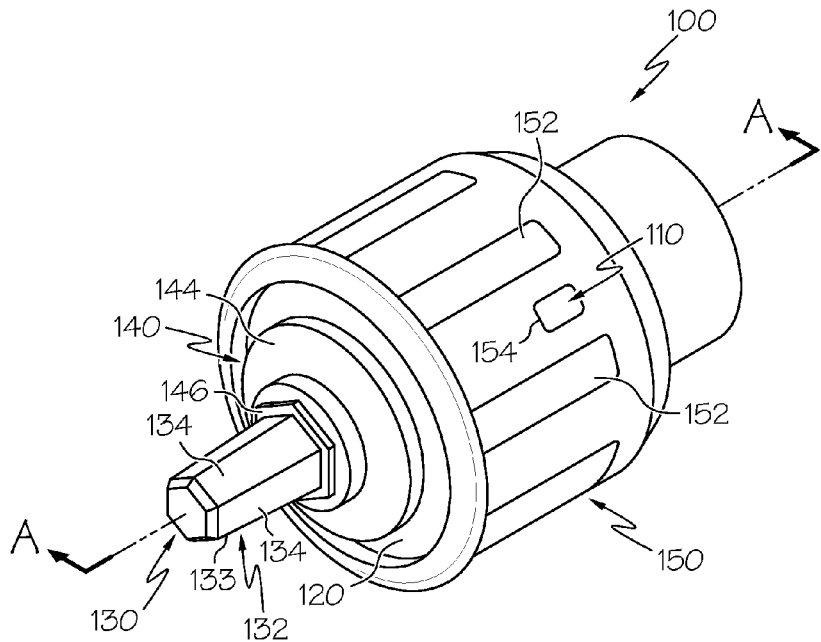
FIG. 1 schematically depicts a side perspective view of a roller insert for a conveyor roller tube according to one or more embodiments shown or described herein.

Referring to the drawings in detail where like numerals indicate the same element throughout the views, FIG. 1 generally depicts a roller insert for a conveyor roller tube. The roller insert includes an outside bearing positioned proximate to an outside end of a cartridge housing and a bushing coupled to the inner race of the outside bearing. A stub axle is positioned relative to cartridge housing such that an elongate body portion of the stub axle extends distally away from the outside end of the cartridge housing. The bushing includes a bore portion that extends along the inner race of the outer bearing and supports the stub axle in a radial orientation, while allowing the stub axle to slide in an axial direction. The roller insert also includes a jacket that at least partially surrounds an outer perimeter of the cartridge housing and extends in an axial direction to at least partially encapsulate the outer race of the outside bearing in the axial direction. The jacket prevents the outside bearing from being extracted from the roller insert in normal operation. The roller insert displays improved dimensional stability that may result in reduced drag of conveyor roller tubes incorporating such roller inserts and increased life of the roller insert. The roller inserts and conveyor roller tubes incorporating the roller inserts will be described in more detail herein with specific reference to the appended drawings.

Referring now to FIG. 1, one embodiment of a roller insert 100 is depicted. The roller insert 100 includes a cartridge housing 110 that supports, among other elements, an outside bearing 120. At least a portion of the cartridge housing 110 is encapsulated in a jacket 150. The roller insert 100 also includes a bushing 140 coupled to the outside bearing 120. A stub axle 130 extends through the bushing 140 and the outside bearing 120. The bushing 140 supports the stub axle 130, allowing the stub axle 130 to rotate relative to the cartridge housing 110 while allowing the stub axle 130 to slide axially relative to the bushing 140.

Figure 2:
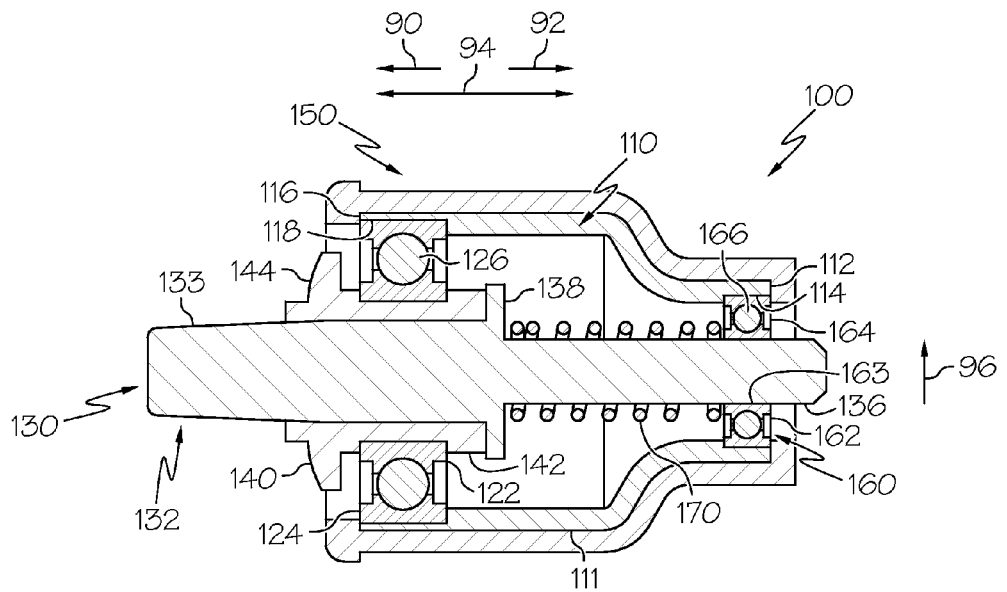
FIG. 2 schematically depicts a side sectional view of a roller insert for a conveyor roller tube according to one or more embodiments shown along line A-A of FIG. 1.

It should be understood that the term "outside," as used herein, refers to the relative position of a component when the roller insert 100 is installed in a conveyor roller tube, as will be discussed below. For purposes of clarity, "outside" refers to the outside direction 90, as depicted in FIG. 2. It should also be understood that the term "inside," as used herein, refer to the relative position of a component when the roller insert 100 is installed in a conveyor roller tube. For purposes of clarity, "inside" refer to the inside direction 92, as depicted in FIG. 2.

Referring now to FIG. 2, the embodiment of the roller insert 100 is depicted in cross section. The roller insert 100 includes a cartridge housing 110 having an inside end 112 and an outside end 116. The inside end 112 of the cartridge housing 110 includes an inside coupling bore 114, and the outside end 116 of the cartridge housing 110 includes an outside coupling bore 118, as described below in further detail. The roller insert 100 includes an outside bearing 120 positioned proximate to the outside end 116 of the cartridge housing 110. The outside bearing 120 includes an inner race 122 and an outer race 124 separated by a plurality of roller elements 126. In the embodiment depicted in FIG. 2, the outside bearing 120 is positioned relative to the cartridge housing 110 such that the outer race 124 is positioned in the outside coupling bore 118 of the cartridge housing 110.

Figure 3:
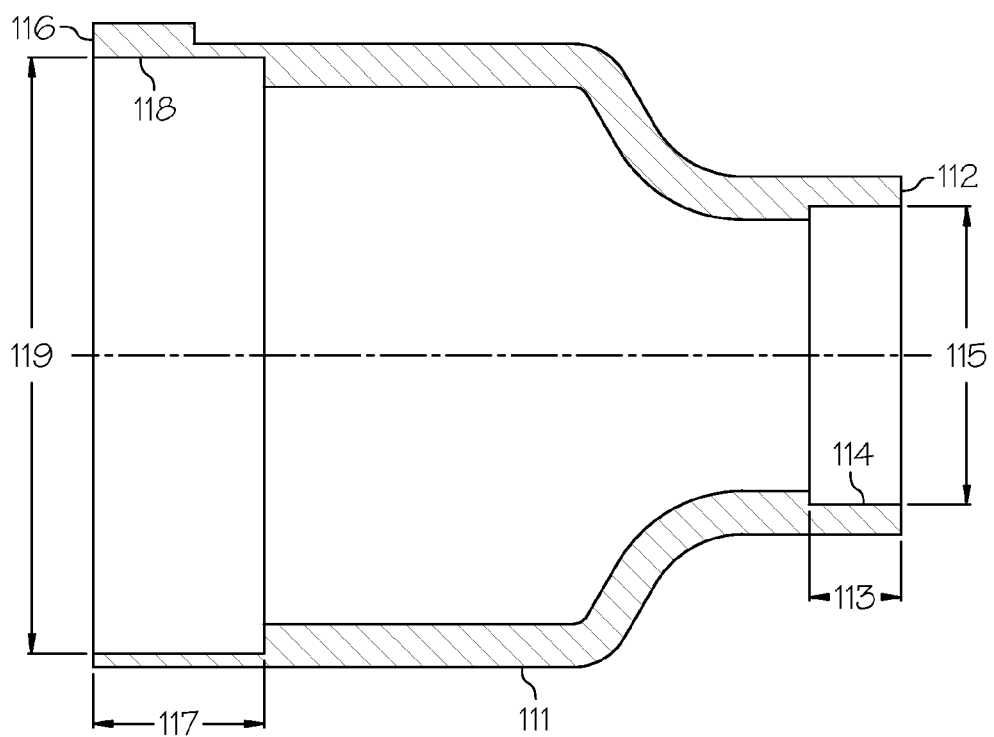
FIG. 3 schematically depicts a side sectional view of a cartridge housing for a roller insert according to one or more embodiments shown along line A-A of FIG. 1.

Referring to FIG. 3, one embodiment of the cartridge housing 110 is depicted in detail. The inside coupling bore 114 of the cartridge housing 110 is positioned proximate to the inside end 112 of the cartridge housing 110. The bore diameter 115 of the inside coupling bore 114 extends an inside bore depth 113. The inside coupling bore 114 of the cartridge housing 110 is sized to support the outer race 164 of the inside bearing 160. Similarly, the outside coupling bore 118 of the cartridge housing 110 is positioned proximate to the inside end 112 of the cartridge housing 110. The bore diameter 119 of the outside coupling bore 118 extends an outside bore depth 117. The outside coupling bore 118 of the cartridge housing 110 is sized to support the outer race 124 of the outside bearing 120.

Referring again to FIG. 2, the roller insert 100 further includes an inside bearing 160 positioned proximate to the inside end 112 of the cartridge housing 110. The inside bearing 160 includes an inner race 162 and an outer race 164 separated by a plurality of roller elements 166. In the embodiment depicted in FIG. 2, the inside bearing 160 is positioned relative to the cartridge housing 110 such that the outer race 124 is positioned in the inside coupling bore 114 of the cartridge housing 110.

The inside bearing 160 and the outside bearing 120 may be commercially available bearings. The inside bearing 160 and the outside bearing 120 may be selected from commercially available precision bearings, for example, bearings rated on the ABEC scale. Bearings may be selected based on the requirements of the end-user application. The inside bearing 160 and the outside bearing 120 may include seals to reduce the likelihood of ingress of contaminants to the roller elements 126, 166.

The roller insert 100 also includes a stub axle 130. The stub axle 130 includes an elongate body portion 132 having a drive interface portion 133 that is positioned distally from the outside end 116 of the cartridge housing 110. The stub axle 130 also includes a rod portion 136 extending away from the elongate body portion 132 in the inside direction 92 (the direction opposite the drive interface portion 133). In the embodiment depicted in FIG. 2, the rod portion 136 has a circular shape and passes through the bore of the inner race 162 of the inside bearing 160. The rod portion 136 may have a "slip fit" with the inner race 162 of the inside bearing 160, such that inside bearing 160 provides support to the rod portion 136 in the radial direction 96 while allowing the rod portion 136 of the stub axle 130 to slide along the inner race 162 in the axial direction 94 with minimal interference.

In the embodiment depicted in FIGS. 1 and 2, the drive interface portion 133 of the stub axle 130 includes a faceted interface 134 defined by a plurality of faceted faces that extend along the elongate body portion 132 of the stub axle 130. As depicted, the faceted interface 134 includes six faceted faces arranged in a hexagonal orientation. The faceted faces in the region of the drive interface portion 133 (i.e., the portion of the stub axle 130 positioned outside of the outside bearing 120) are tapered such that the overall thickness of the stub axle 130 decreases with increasing distance from the outside bearing 120. In the embodiment depicted in FIGS. 1 and 2, the elongate body portion 132 of the stub axle 130 positioned inside of the drive interface portion 133 (i.e., the portion of the stub axle 130 positioned towards the inside direction 92 of the outside bearing 120) includes a plurality of faceted faces having a uniform spacing, such that the elongate body portion 132 of the stub axle 130 positioned inside of the drive interface portion 133 is not tapered.

Referring again to FIG. 2, the stub axle 130 may also include an annular shoulder 138 positioned between the elongate body portion 132 and the rod portion 136. As depicted in FIG. 2, the stub axle 130 may be inserted into the roller insert 100 such that the annular shoulder 138 is positioned between the outside bearing 120 and the inside end 112 of the cartridge housing 110.

The roller insert 100 may also include a spring 170 positioned inside the cartridge housing 110. As depicted in FIG. 2, the spring 170 is positioned to contact the inside bearing 160 and the annular shoulder 138 of the stub axle 130. The spring 170 applies a force to the stub axle 130 to bias the stub axle 130 in the outside direction 90. The spring 170 may apply a pre-tension to the stub axle 130 to seat the stub axle 130 in a fully extended position in the outside direction 90. The spring 170 may also allow the elongate body portion 132 of the stub axle 130 to be retracted into the cartridge housing 110, while the spring 170 continues to apply a force that biases the stub axle 130 in the outside direction 90.

Still referring to FIG. 2, the roller insert 100 further includes a bushing 140 coupled to the inner race 122 of the outside bearing 120. The bushing 140 may be secured to the inner race 122 of the outside bearing 120 such that the bushing 140 rotates with the inner race 122, as the inner race 122 rotates relative to the outer race 124 of the outside bearing 120. The bushing 140 includes a bore portion 142 that extends along the inner race 122 of the outside bearing 120, and a cap portion 144 that extends radially outwards from the bore portion 142. As depicted in FIG. 2, the cap portion 144 extends radially to a position outside of the inner race 122 of the outside bearing 120, such that the cap portion 144 at least partially blocks the outside bearing 120. The cap portion 144 may reduce the likelihood of ingress of contaminants to the outside bearing 120, and may otherwise protect the outside bearing 120 from damage.

Referring to FIGS. 1 and 2, the bore portion 142 of the bushing 140 includes a faceted opening 146. The faceted opening 146 includes the same number and pattern of facets as the number and pattern of faceted faces of the elongate body portion 132 of the stub axle 130. The faceted opening 146 of the bushing 140 may provide support to the stub axle 130 by contacting the faces of the elongate body portion 132 of the stub axle 130. The faceted opening 146 may provide support to the stub axle 130 in the radial direction 96, such that movement of the stub axle 130 is limited when a force is applied to the roller insert 100 in the radial direction 96. Further, as discussed hereinabove, the faceted faces of the stub axle 130 positioned inside of the drive interface portion 133 are uniformly spaced, and are not tapered. The faceted opening 146 of the bushing 140 may support the stub axle 130 when slid in the inside direction 92 by continuing to contact the faceted faces of the stub axle 130 positioned inside of the drive interface portion 133.

Referring again to FIG. 2, the roller insert 100 also includes a jacket 150 that at least partially surrounds an outer perimeter 111 of the cartridge housing 110. The jacket 150 extends in an axial direction 94 along the outer perimeter 111 of the cartridge housing 110 to a position beyond the inside end 112 of the cartridge housing 110 and the outside end 116 of the cartridge housing 110. The portion of the jacket 150 extending beyond the inside end 112 of the cartridge housing 110 in the inside direction 92 is positioned radially inward of the inside coupling bore 114 such that the jacket 150 at least partially encapsulates the outer race 164 of the inside bearing 160. Similarly, the portion of the jacket 150 extending beyond the outside end 116 of the cartridge housing 110 in the outside direction 90 is positioned radially inward of the outside coupling bore 118 such that the jacket 150 at least partially encapsulates the outer race 124 of the outside bearing 120.

Referring again to FIG. 1, the jacket 150 may include a plurality of ribs 152 that extend radially outwards such that the ribs 152 increase the diameter of the jacket 150 in local regions. The jacket 150 may also include a plurality of windows 154, or localized openings in the jacket 150. As depicted in FIG. 1, portions of the cartridge housing 110 may be visible through the windows 154 in the jacket 150.

The cartridge housing 110, the bushing 140, and/or the jacket 150 may be made from a variety of materials including, for example and without limitation, polymers such as polyester, nylon, polypropylene, polyethylene, polyurethane, and the like. The cartridge housing 110, the bushing 140, and/or the jacket 150 may include reinforcements including, for example and without limitation, glass fibers or fillers, carbon fibers or fillers, aramid fibers or fillers, metallic fibers or fillers, and the like. It should be understood that the cartridge housing 110, the bushing 140, and/or the jacket 150 may each be made from the same material or dissimilar materials. The cartridge housing 110 may be made from a material capable of maintaining dimensional stability at elevated temperatures, for example, temperatures greater than 200° F. In some embodiments, the cartridge housing 110, the bushing 140, and/or the jacket 150 may be made from an electrically conductive polymer, such that metallic components of the roller insert 100 and the polymer-based components of the roller insert 100 are in electrical conductivity with one another. Electrical conductivity of components of the roller insert 100 may dissipate static electricity that builds in operation of the roller insert 100.

The inside bearing 160, the outside bearing 120, the stub axle 130, and the spring 170 may be made from a variety of metallic materials, as conventionally known, including steel alloys. The stub axle 130 may be made from a steel alloy and manufactured in a forging process, which increases the strength of the surfaces of the stub axle 130.

The jacket 150 may be produced in an injection molding processes. In such a process, the inside bearing 160 and the outside bearing 120 are positioned in the respective inside coupling bore 114 and outside coupling bore 118 of the cartridge housing 110 prior to the injection molding operation. With the inside bearing 160 and the outside bearing 120 so positioned in the cartridge housing 110, the jacket 150 may be introduced to at least partially cover the outer perimeter 111 of the cartridge housing 110. In the injection molding operation, the jacket 150 may be directed to flow in the axial direction 94 such that the jacket 150 at least partially encapsulates the outer race 124 of the outside bearing 120 and at least partially encapsulates the outer race 164 of the inside bearing 160. The cartridge housing 110 may maintain dimensional accuracy to support the inside bearing 160 and the outside bearing 120 during the injection molding process, where the material forming the jacket 150 is introduced at an elevated temperature. Because the inside bearing 160 and the outside bearing 120 are maintained in position in the cartridge housing 110 during the injection molding operation of the jacket 150, the accuracy of relative positioning of the inside bearing 160 and the outside bearing 120 in the fully-constructed roller insert 100 may be maintained. Accordingly, roller inserts 100 according to the present disclosure may have low variability in relative positioning of the inside bearing 160 and the outside bearing 120, and low misalignment of the inside bearing 160 and the outside bearing 120, which may reduce drag on roller inserts 100. Thus, conveyor assemblies including roller inserts 100 according to the present disclosure may require less power to operate than conveyor assemblies using other axle positioning features. Further, conveyor assemblies including roller inserts 100 according to the present disclosure may exhibit increased life than conveyor assemblies using other axle positioning features.

Figure 4:
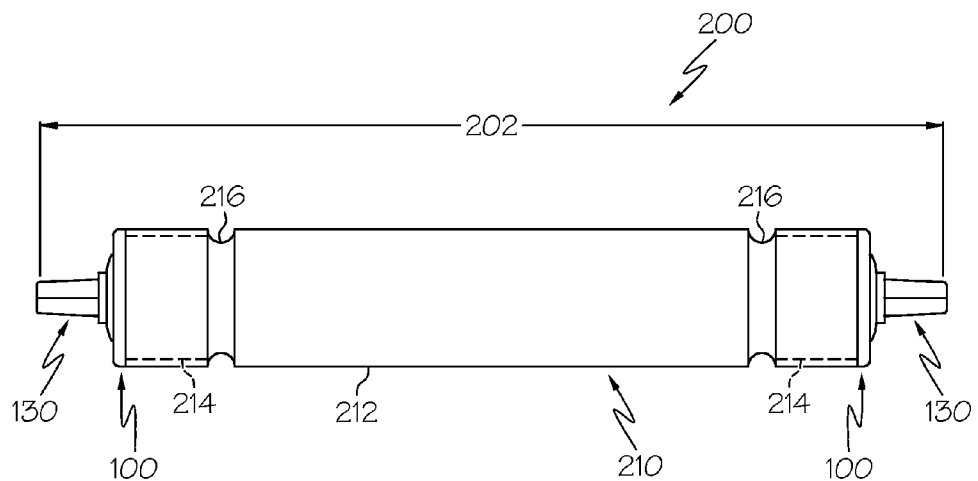
FIG. 4 schematically depicts a top view of an uninstalled conveyor roller tube having roller inserts according to one or more embodiments shown or described herein.

Referring now to FIG. 4, one embodiment of a roller assembly 200 for use in a conveyor roller is depicted. The roller assembly 200 includes a conveyor roller tube 210 having an outer diameter 212 and an inner diameter 214. The conveyor roller tube 210 may also include at least one groove 216 positioned around the outer diameter 212 of the conveyor roller tube 210, and having a diameter less than the outer diameter 212 of the conveyor roller tube 210. As depicted in FIG. 4, the roller assembly 200 includes two roller inserts 100 positioned at opposite ends of the conveyor roller tube 210. The roller inserts 100 are inserted into the inner diameter 214 of the conveyor roller tube 210. Portions of the jacket 150 of the roller inserts 100, including the ribs 152 (see FIG. 1), may be deflected inwards or removed, such that the roller inserts 100 maintain a tight fit with the inner diameter 214 of the conveyor roller tube 210. The roller assembly 200 as depicted in FIG. 4 is shown in an uninstalled state, where the stub axles 130 of the roller inserts 100 are biased outwards. Thus, the roller assembly 200 evaluated from end-to-end of the stub axles 130 has an uninstalled overall length 202.

Figure 5:
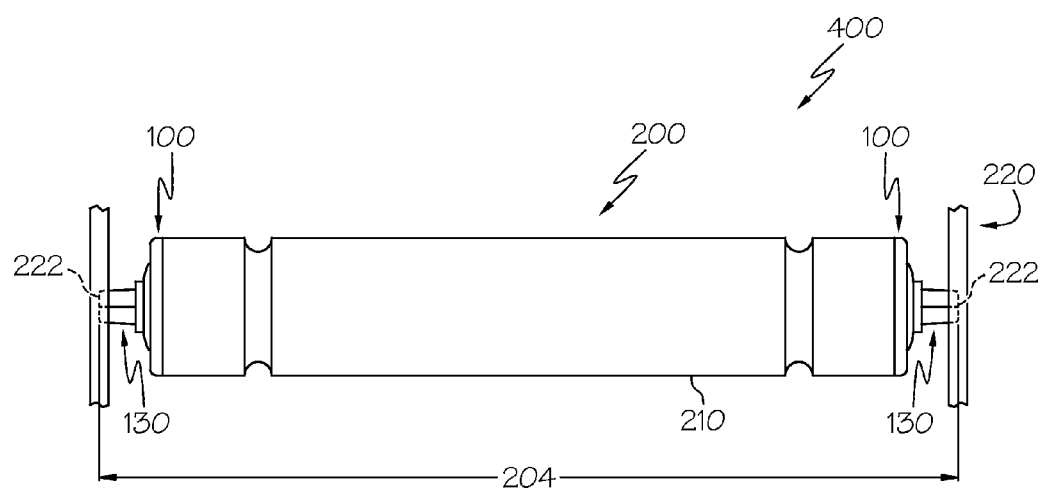
FIG. 5 schematically depicts a top view of a conveyor roller tube having roller inserts installed into an elongate support frame according to one or more embodiments shown or described herein.

Referring now to FIG. 5, the embodiment of the roller assembly 200 depicted in FIG. 4 is shown installed into a portion of elongate rails 220. A plurality of roller assemblies 200 installed into the elongate rails 220 form the conveyor system 400. As depicted in FIG. 5, the elongate rails 220 include pockets 222 that are positioned relative to one another along opposite sides of the elongate rails 220. The roller assembly 200 is secured into the elongate rails 220 by positioning the stub axles 130 inside the pockets 222 of the elongate rails 220. Comparing FIG. 5 with FIG. 4, the pockets 222 in the elongate rails 220 may be spaced apart from one another a distance less than the uninstalled overall length 202 of the roller assembly 200. As such, to position the roller assembly 200 into the pockets 222 of the elongate rails 220, the stub axles 130 may be biased in the inside direction 92 as compared to the roller assembly 200 in the uninstalled condition. The stub axles 130 therefore position the roller assembly 200 in the installed condition, where the roller assembly 200 has an installed overall length 204 smaller than the uninstalled overall length 202. Further, to install the roller assembly 200 into the elongate rails 220, the stub axles 130 may be biased in the inside direction 92 to a distance less than the installed overall length 204. Accordingly, the roller inserts 100 continue to support the stub axles 130 at positions other than fully biased in the outside direction 90.

In yet another embodiment of the roller assembly (not shown), the roller assembly may include a roller insert 100 according to the present disclosure installed at one end of the conveyor roller tube 210, and a roller insert having a non-retractable stub axle installed at the opposite end of the conveyor roller tube 210.

Figure 6:
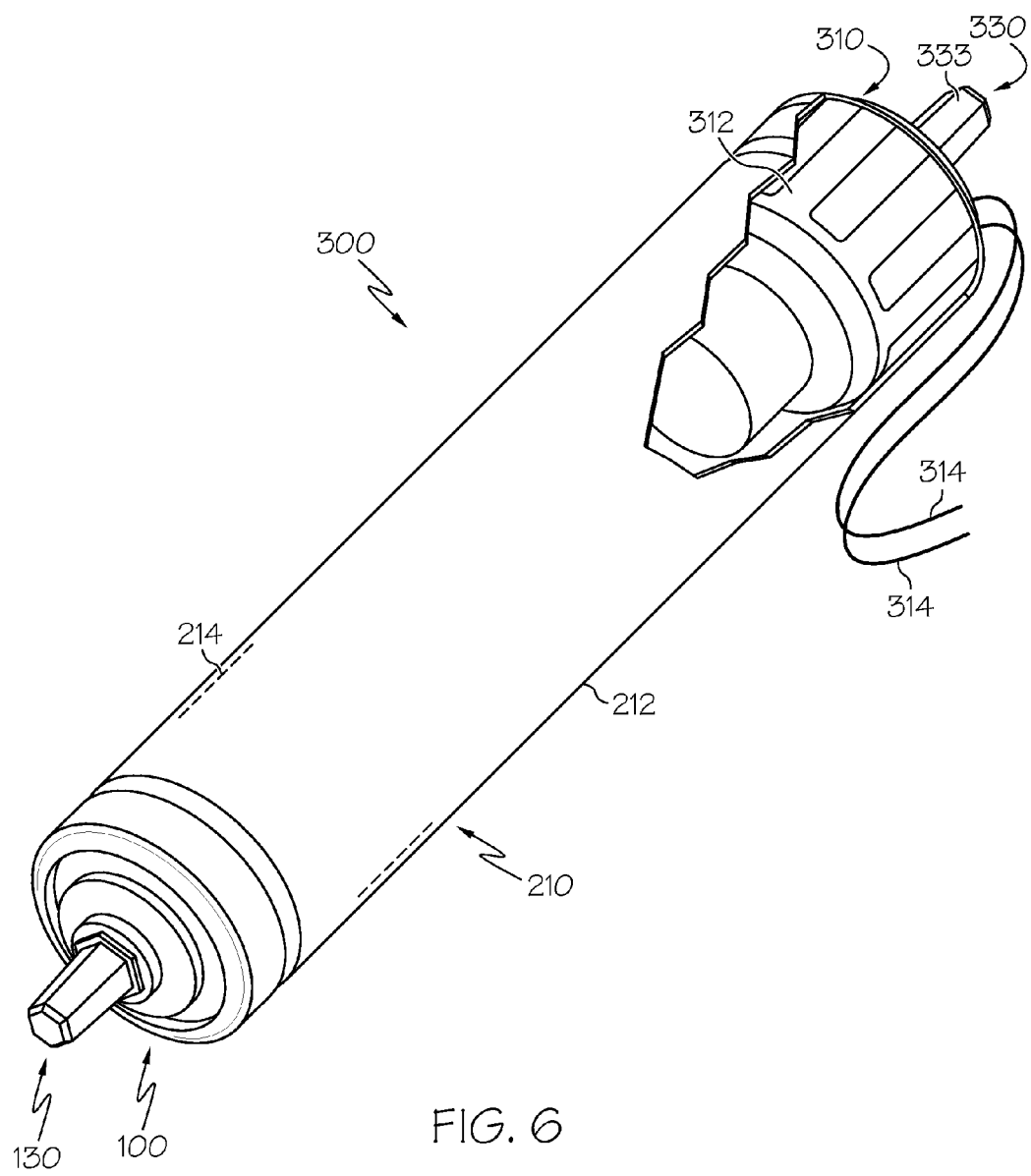
FIG. 6 schematically depicts a side perspective partial cutaway view of a conveyor roller tube having an electric motor according to one or more embodiments shown or described herein.

Referring now to FIG. 6, another embodiment of a roller assembly 300 is depicted. In this embodiment, the roller assembly 300 includes one roller insert 100 positioned at one end of the conveyor roller tube 210, and a self-contained electric motor 310 positioned at the opposite end of the conveyor roller tube 210. The self-contained electric motor 310 may include a rotor and stator portion 312 that extends into the inner diameter 214 of the conveyor roller tube 210. Electric leads 314 may extend outside of the roller assembly 300 for attachment to an electrical power source to supply the self-contained electric motor 310 with power. When commanded, the self-contained electric motor 310 rotates the roller assembly 300, along with any other non-powered roller assembly (i.e., the roller assembly 200 of FIGS. 4 and 5) that is rotationally coupled to the roller assembly 300.

The self-contained electric motor 310 may include a stub axle 330 having a drive interface portion 333 that mates with the pockets 222 of the elongate rails 220, as depicted in FIG. 5. The stub axle 330 of the self-contained electric motor 310 may or may not be at least partially retractable. As such, the stub axle 130 of the roller insert 100 may be biased in the inside direction 92 when the roller assembly 300 is installed into the elongate rails 220 of the conveyor system 400 (see FIG. 5).

It should be understood that roller inserts according to the present disclosure include cartridge housings and jackets at least partially surrounding the cartridge housing that encapsulate bearings. The cartridge housings and the jackets accurately position the bearings within the roller insert and relative to one another to control variability in positioning and minimize misalignment, which may contribute to increased drag in the roller inserts. Reduced drag in the roller inserts may reduce the power required to be applied to the conveyor system in which the roller inserts are used, along with an increase in life of the roller insert itself.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A roller insert for conveyor roller tubes comprising:
a cartridge housing having an inside end and an outside end;
an outside bearing positioned proximate to the outside end of the cartridge housing, the outside bearing having an inner race and an outer race;
an inside bearing positioned proximate to the inside end of the cartridge housing;
a stub axle comprising an elongate body portion having a drive interface portion positioned distally from the outside end of the cartridge housing;
a bushing coupled to the inner race of the outside bearing, the bushing comprising a bore portion extending along the inner race of the outside bearing; and
a jacket at least partially surrounding an outer perimeter on an outer circumference of the cartridge housing and extending in an axial direction to at least partially encapsulate the outer race of the outside bearing in the axial direction and an outer race of the inside bearing in the axial direction.

2. The roller insert of claim 1, wherein the bore portion of the bushing comprises a faceted opening and the drive interface portion of the stub axle comprises a faceted interface having the same number of facets as the faceted opening.

3. The roller insert of claim 1, wherein the bore portion of the bushing supports the stub axle in a radial orientation and the stub axle is slidable relative to the outside bearing in the axial direction.

4. The roller insert of claim 1, wherein the stub axle further comprises a rod portion extending away from the elongate body portion in a direction opposite the drive interface portion and the rod portion of the stub axle is mated with a bore of the inside bearing.

5. The roller insert of claim 1, wherein the cartridge housing further comprises an outside coupling bore positioned proximate to the outside end of the cartridge housing, the outside coupling bore comprising a bore diameter and an outside bore depth that support the outer race of the outside bearing.

6. The roller insert of claim 1, wherein the cartridge housing further comprises an inside coupling bore positioned proximate to the inside end of the cartridge housing, the inside coupling bore comprising a bore diameter and an inside bore depth that support an outer race of the inside bearing.

7. The roller insert of claim 1, wherein the stub axle further comprises an annular shoulder positioned between the outside bearing and the inside end of the cartridge housing.

8. The roller insert of claim 7 further comprising a spring positioned inside the cartridge housing, wherein the spring contacts the annular shoulder to bias the stub axle in an outside direction.

9. A roller assembly for use in a conveyor roller, the roller assembly comprising:
- a conveyor roller tube having an outer diameter and an inner diameter; and
- a roller insert inserted into the inner diameter of the conveyor roller tube, the roller insert comprising:
  - a cartridge housing having an inside end and an outside end;
  - an outside bearing positioned proximate to the outside end of the cartridge housing, the outside bearing having an inner race and an outer race;
  - an inside bearing positioned proximate to the inside end of the cartridge housing;
  - a stub axle comprising an elongate body portion having a drive interface portion positioned distally from the outside end of the cartridge housing;
  - a bushing coupled to the inner race of the outside bearing, the bushing comprising a bore portion extending along the inner race of the outside bearing; and
  - a jacket at least partially surrounding an outer perimeter on an outer circumference of the cartridge housing and extending in an axial direction to at least partially encapsulate the outer race of the outside bearing in the axial direction and an outer race of the inside bearing in the axial direction.

10. The roller assembly of claim 9, wherein the cartridge housing further comprises an inside coupling bore positioned proximate to the inside end of the cartridge housing, the inside coupling bore comprising a bore diameter and an inside bore depth that support an outer race of the inside bearing.

11. A roller insert for conveyor roller tubes comprising:
- a cartridge housing having an inside end and an outside end;
- an outside bearing positioned proximate to the outside end of the cartridge housing, the outside bearing having an inner race and an outer race;
- an inside bearing positioned proximate to the inside end of the cartridge housing, the inside bearing having an inner race and an outer race;
- a stub axle comprising an elongate body portion having a drive interface portion positioned distally from the outside end of the cartridge housing; and
- a jacket at least partially surrounding an outer perimeter on an outer circumference of the cartridge housing and extending in an axial direction to at least partially encapsulate the outer race of the outside bearing and the outer race of the inside bearing in the axial direction.

12. The roller insert of claim 11, further comprising a bushing coupled to the inner race of the outside bearing, the bushing comprising a bore portion extending along the inner race of the outside bearing, wherein the bore portion of the bushing comprises a faceted opening and the drive interface portion of the stub axle comprises a faceted interface having the same number of facets as the faceted opening, wherein the stub axle is rotatable with respect to the cartridge housing, and the bore portion of the bushing supports the stub axle in a radial orientation and the stub axle is slidable relative to the outside bearing in the axial direction.

13. The roller insert of claim 11, wherein the cartridge housing further comprises:
- an outside coupling bore positioned proximate to the outside end of the cartridge housing, the outside coupling bore comprising a bore diameter and an outside bore depth sized to support the outer race of the outside bearing; and
- an inside coupling bore positioned proximate to the inside end of the cartridge housing, the inside coupling bore comprising a bore diameter and an inside bore depth to support the outer race of the inside bearing.

14. The roller insert of claim 11, wherein the roller insert further comprises a spring positioned inside the cartridge housing and the stub axle further comprises an annular shoulder positioned between the outside bearing and the inside end of the cartridge housing, wherein the spring contacts the annular shoulder to bias the stub axle in an outside direction.

15. The roller assembly of claim 9, wherein the cartridge housing further comprises an outside coupling bore positioned proximate to the outside end of the cartridge housing, the outside coupling bore comprising a bore diameter and an outside bore depth that support the outer race of the outside bearing.

16. The roller assembly of claim 9 further comprising a second roller insert inserted into the inner diameter of the conveyor roller tube at an opposite end of the conveyor roller tube.

17. The roller assembly of claim 9 further comprising a self-contained electric motor inserted into the inner diameter of the conveyor roller tube at an opposite end of the conveyor roller tube.

18. The roller assembly of claim 9, wherein the roller insert further comprises a spring positioned inside the cartridge housing and the stub axle further comprises an annular shoulder positioned between the outside bearing and the inside end of the cartridge housing, wherein the spring contacts the annular shoulder to bias the stub axle in an outside direction and the stub axle is slidable relative to the outside bearing in the axial direction to decrease an overall length of the roller assembly.

19. The roller assembly of claim 9, wherein the bore portion of the bushing comprises a faceted opening and the drive interface portion of the stub axle comprises a faceted interface having the same number of facets as the faceted opening.

* * * * *